(12) United States Patent
Watts et al.

(10) Patent No.: US 11,550,579 B2
(45) Date of Patent: Jan. 10, 2023

(54) SYSTEMS AND METHODS FOR CONFIGURABLE ORDERED TRANSFORMATION OF DATABASE CONTENT

(71) Applicant: TD Ameritrade IP Company, Inc., Omaha, NE (US)

(72) Inventors: Sean William Watts, Hoboken, NJ (US); Igor Vornovitskiy, IV, Fair Lawn, NJ (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 365 days.

(21) Appl. No.: 16/817,535

(22) Filed: Mar. 12, 2020

(65) Prior Publication Data
US 2021/0286621 A1    Sep. 16, 2021

(51) Int. Cl.
| | | |
|---|---|---|
| *G06F 9/30* | (2018.01) | |
| *G06F 9/38* | (2018.01) | |
| *G06F 9/48* | (2006.01) | |
| *G06F 16/182* | (2019.01) | |
| *G06F 16/16* | (2019.01) | |
| *G06F 40/174* | (2020.01) | |
| *G06F 40/205* | (2020.01) | |

(52) U.S. Cl.
CPC ........ *G06F 9/30145* (2013.01); *G06F 9/3836* (2013.01); *G06F 9/4881* (2013.01); *G06F 16/168* (2019.01); *G06F 16/182* (2019.01); *G06F 40/174* (2020.01); *G06F 40/205* (2020.01)

(58) Field of Classification Search
CPC .... G06F 16/168; G06F 16/182; G06F 9/3802; G06F 9/3885
See application file for complete search history.

(56) References Cited

U.S. PATENT DOCUMENTS

| | | | |
|---|---|---|---|
| 8,255,890 B2 * | 8/2012 | Luszczek | G06F 9/5027 717/149 |
| 10,733,198 B1 * | 8/2020 | Marschner | G06F 16/252 |
| 2016/0378811 A1 * | 12/2016 | Kapoor | G06F 16/957 707/741 |
| 2019/0171670 A1 * | 6/2019 | Zhuang | G06F 16/213 |
| 2021/0090694 A1 * | 3/2021 | Colley | G16B 40/00 |

* cited by examiner

*Primary Examiner* — Ashish Thomas
*Assistant Examiner* — Jedidiah P Ferrer
(74) *Attorney, Agent, or Firm* — Harness, Dickey & Pierce, P.L.C.

(57) ABSTRACT

A system includes processor hardware and memory hardware that stores instructions. The instructions include, in response to receiving a request, determining a request type of the request, retrieving a first set of collected information, and selecting a first set of instructions corresponding to the request type. The instructions include constructing a first result by executing each instruction of the first set of instructions to create the first entry as a nested entry within the first result including data of the first set of collected information identified in the first set of instructions as nested or retrieve first data of the first set of collected information identified by the first instruction and add the first data to the first entry of the first result. The instructions include transforming a display of the operator device to complete a set of fields displayed on the display with corresponding entries of the first result.

22 Claims, 6 Drawing Sheets

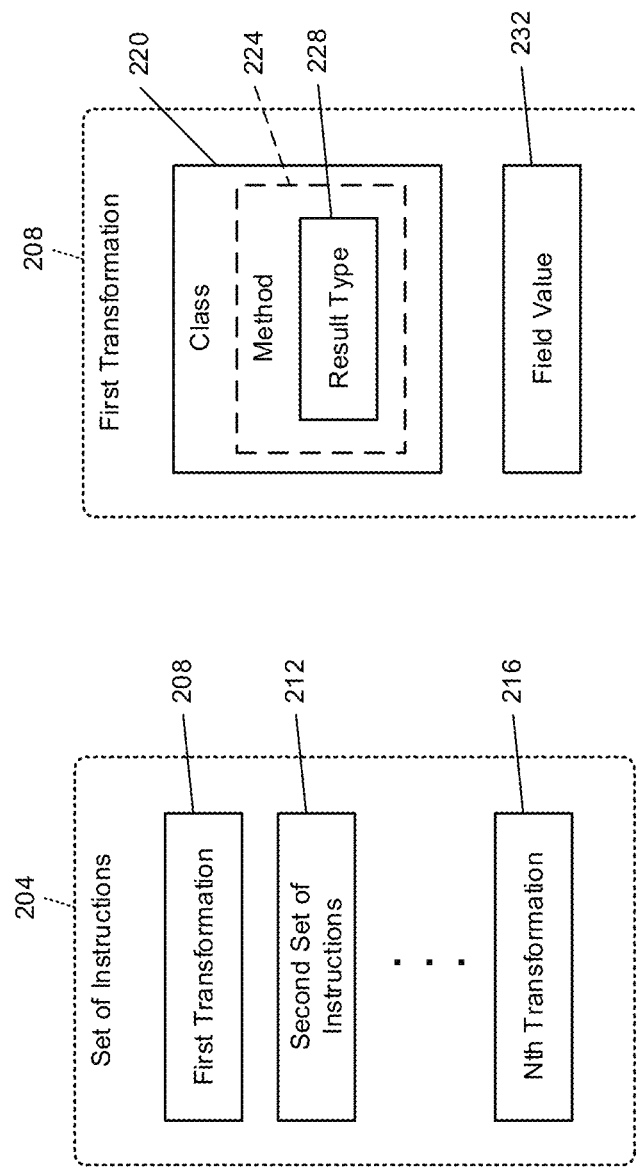

SYSTEMS AND METHODS FOR CONFIGURABLE ORDERED TRANSFORMATION OF DATABASE CONTENT

FIELD

The present disclosure relates to data manipulation and, more specifically, to transforming and displaying database information.

BACKGROUND

Digitization of handwritten forms often results in the content of the forms being extracted into a single type of data structure. For example, a third party can perform such data collection and provide the extracted data in a database available to an entity requesting the data collection. For the entity to access and read the extracted data, data analysis must be done individually on each type of form and a developer with technical knowledge needs to create a custom solution for each form. These custom solutions then fetch the extracted data for a given form, find the important fields, and inject these fields into a process performed by the entity.

This data transformation is cumbersome and overwhelming for developers because completing all the forms would require substantial time away from other tasks. Moreover, debugging and troubleshooting is difficult as each form might use a different solution created by a different developer. The sheer number of forms, all with different teams and different developers, would result in multiple custom solutions that would all fix the same problem. Maintenance of these solutions would also require highly skilled developers.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes processor hardware and memory hardware coupled to the processor hardware. The memory hardware stores a collected information database including a set of collected information for a first user, an instructions database including a set of instructions for each information request type, and instructions for execution by the processor hardware. The instructions include, in response to receiving a first information request from an operator device, determining a first information request type based on the first information request, obtaining, from the collected information database, a first set of collected information, and selecting, from the instructions database, a first set of instructions corresponding to the first information request type.

The instructions include constructing a first result by executing each instruction of the first set of instructions to, in response to a first instruction of the first set of instructions indicating a first entry is nested, create the first entry as a nested entry within the first result including data of the first set of collected information identified in the first set of instructions as nested. The instructions include, in response to the first instruction of the first set of instructions indicating the first entry is singular, obtain first data of the first set of collected information identified by the first instruction and add the first data to the first entry of the first result. The instructions include transforming a display of the operator device to complete a set of fields displayed on the display with corresponding entries of the first result.

In other features, an indication that the first entry is nested includes the first instruction being a nested set of instructions. In other features, each nested instruction of the nested set of instructions is executed prior to executing a subsequent instruction of the first set of instructions. In other features, the subsequent instruction is listed after the nested set of instructions. In other features, the nested entry includes a plurality of entries identified as corresponding to the nested entry in corresponding nested instructions of the nested set of instructions. In other features, the first information request type indicates a form number and a version number.

In other features, the collected information database is a remote database and stores a plurality of sets of collected information extracted from forms submitted by users. In other features, the first information request is received from the operator device in response to the operator device initiating a process for the first user. In other features, the first result includes a number of entries corresponding to a number of instructions included in the first set of instructions. In other features, the first set of collected information corresponds to the first information request type. In other features, each entry of the first result corresponds to a field of the set of fields displayed on the display. In other features, the instructions include storing the first result in a result database.

A method includes, in response to receiving a first information request from an operator device, determining a first information request type based on the first information request and obtaining, from a collected information database, a first set of collected information. The collected information database includes a set of collected information for a first user. The method includes selecting, from an instructions database, a first set of instructions corresponding to the first information request type. The instructions database includes a set of instructions for each information request type.

The method includes constructing a first result by executing each instruction of the first set of instructions to, in response to a first instruction of the first set of instructions indicating a first entry is nested, create the first entry as a nested entry within the first result including data of the first set of collected information identified in the first set of instructions as nested. The method includes, in response to the first instruction of the first set of instructions indicating the first entry is singular, obtain first data of the first set of collected information identified by the first instruction and add the first data to the first entry of the first result. The method includes transforming a display of the operator device to complete a set of fields displayed on the display with corresponding entries of the first result.

In other features, an indication that the first entry is nested includes the first instruction being a nested set of instructions. In other features, each nested instruction of the nested set of instructions is executed prior to executing a subsequent instruction of the first set of instructions. In other features, the subsequent instruction is listed after the nested set of instructions. In other features, the nested entry includes a plurality of entries identified as corresponding to the nested entry in corresponding nested instructions of the nested set of instructions. In other features, the first information request type indicates a form number and a version number.

In other features, the collected information database is a remote database and stores a plurality of sets of collected information extracted from forms submitted by users. In other features, the first information request is received from the operator device in response to the operator device initiating a process for the first user. In other features, the first result includes a number of entries corresponding to a number of instructions included in the first set of instructions. In other features, the first set of collected information corresponds to the first information request type.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 3A-3D are graphical representations of example data structures used to implement content transformation according to the principles of the present disclosure.

In the drawings, reference numbers may be reused to identify similar and/or identical elements.

DETAILED DESCRIPTION

Figure 1:
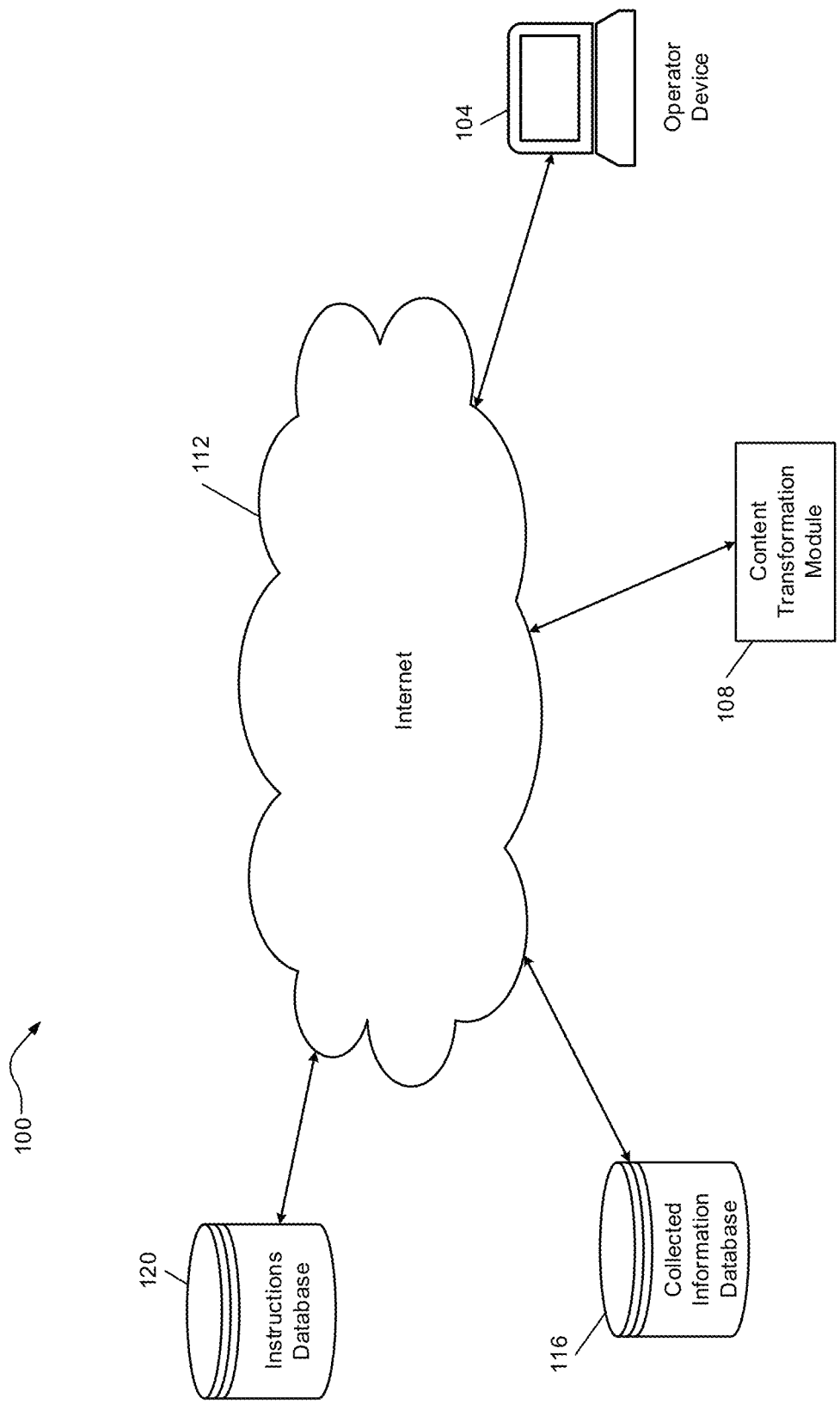
FIG. 1 is a high-level example block diagram of a content transformation system and a network communication system according to the principles of the present disclosure.

A centralized content transformation system obtains collected information and transforms the information into a useable and displayable result for automatically supplying data to corresponding fields on a display of an operator device during a process. For example, an operator may use their operator device to transmit a request to the content transformation system when initiating a particular process for a particular user. Prior to initiating the process, the operator can select the process (for example, for a financial institution, the process may be opening a checking or savings account) and specify the user.

Since user information needed to proceed with the process may have already been collected for the user, the request is submitted to the content transformation system to obtain collected information for the user. Then, the content transformation system automatically transforms the format of the collected information into a result that is readable by and displayable on the operator device. The operator device receives the result and is configured to assist in performance of the process by displaying the result, filling fields of a form, or populating variables, such as in a software subroutine or fields in a database record. In other words, the content transformation system obtains previously collected data and transforms the previously collected data into a format that the operator device can consume.

In various implementations, the operator device receives the result for additional processing before displaying the transformed, previously collected information on the operator device. The content transformation system may implement the transformation using a set of instructions constructed by an operator. Each set of instructions is stored in an instructions database and includes a transformation instruction for each piece of data included in the collected information. The collected information may include pieces of data such as an account number, a first name, a last name, an address, etc.

Each piece of data is entered into the result according to a corresponding transformation instruction included in the set of instructions. Therefore, a new set of instructions may be easily created by an operator by selecting transformation instructions according to which pieces of information are needed in the result to perform the corresponding process. For example, the previously collected information may be in a particular format that was completed by the user or according to a format of the third party entity collecting the information.

In various implementations, the collected information was handwritten on a form developed by an entity associated with, or operating, the operator device. The collected information may be stored in a collected information database that is indexed according to users. Then, when an operator is attempting to initiate a process, such as opening a checking account for a user, the operator can request the data collected from the user on an account opening form that the user completed and submitted.

Since the collected information database extracts and stores form data in a singular structure, the collected information for opening an account for the user may be obtained and transformed for processing by the operator system on the operator device. Therefore, the content transformation system obtains the collected information in response to receiving the operator request and transforms the collected information into a combination of a singular and nested structure, as dictated by a corresponding set of instructions, to be readable and consumable on the operator side. The transformed collected information is also capable of being displayed on the operator device and entered in fields that correspond to the respective pieces of data. The content transformation system automates and initiates the process requested by the operator.

As mentioned previously, operators can create each set of instructions based on the information supplied by each form or set of collected information. The content transformation system can then obtain the set of instructions that correspond to the data needed for the request or process being initiated. Further, each piece of data included in a set of collected information corresponds to one transformation instruction in a set of instructions. For example, a first transformation instruction directs the transformation of an account number within the collected information into an account number entry in the result.

In this way, each set of instructions can contain transformation instructions already constructed and stored in an instruction creation database. Therefore, a set of instructions may be arranged using stored transformation instructions, and the organization and arrangement of the instructions are created to correspond to a particular form. In this way, an operator can construct a set of instructions using a tool that provides a selection method of stored transformation instructions. The operator would not necessarily require formal training or need software development experience, increasing efficiency for the consumption of collected information.

The content transformation system improves client experience by reducing the amount of paper forms and increasing accurate data capture by accessing and using previously collected information. Further, the content transformation system results in a dynamic transformation without having to write code that supports multiple transformations and multiple versions of the same form.

The content transformation system is also approachable by non-developers, expanding the list of who can assign digitizing tasks, dramatically increasing digitization of forms and access to the information in the digitized forms. Digitization of forms is a convergent problem for companies across many industries. The content transformation system of the present disclosure is a technical solution that works as an agnostic intermediary that can be easily tailored to operate with different processes and form databases. The content transformation system does not simply rely on the speed and storage capacity offered by computers but instead implements a transformational architecture that allows for ordered sets of nested instructions to be defined for specific practical applications.

FIG. 1 is a high-level block diagram of an example content transformation system 100 and a network communication system, such as the Internet 112. The content transformation system 100 includes an operator device 104 that communicates with a content transformation module 108. The content transformation module 108 receives a request from the operator device 104 to transform collected information of a user for a process. For example, an operator of the operator device 104 can be initiating the opening of a bank account for the user. To open the account, the operator needs to obtain user information: for example, a first name, a last name, a social security number, etc. In another example, the operator may be performing a particular trade for the user, in which case the operator may also need an account number.

Figures 3C, 3D:
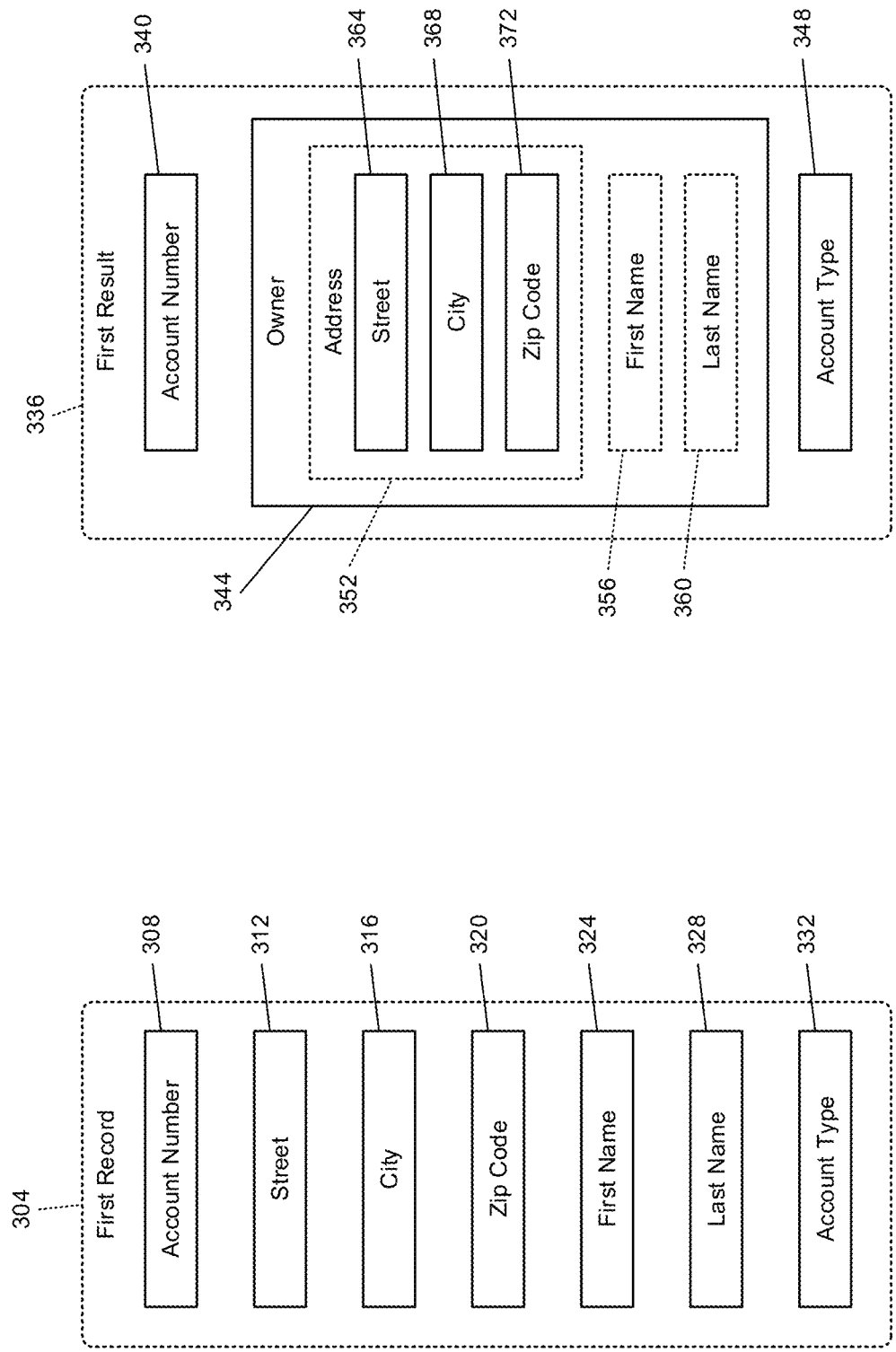

The information needed to open the account may have been submitted by the user via a handwritten form. Then, data from the handwritten form is extracted (such as by using optical character recognition, OCR) and stored in a collected information database 116 by a third party, such as a vendor. As shown in FIG. 3C, the data stored in a set of collected information for a user is a specific, singular structure that does not contain, for example, an address, but instead contains a street, a city, and a zip code without any indication that the three pieces of data collectively amount to an address. However, the operator system within the operator device 104 understands and consumes information in a nested structure that indicates a relationship between particular pieces of data.

Therefore, in order to read the previously collected information stored in the collected information database 116, the operator device 104 transmits a request to the content transformation module 108 to transform the collected information into a structure readable by the operator device 104. The content transformation module 108 obtains the collected information that corresponds to an information type indicated in the request (for example, the information type may be a form number), then the content transformation module 108 obtains a set of instructions from an instructions database 120.

The set of instructions corresponds to the information type indicated in the response (that is, the set of instructions is for the form number and includes the relevant transformation instructions). The content transformation module 108 then executes the set of instructions to transform the collected information into a result that the operator device 104 can read and consume. As mentioned previously, the result may be received by the operator device 104 fills the fields appropriate to the process (such as account creation) using the pieces of data transformed into the result and displays the collected information needed for the current step of the process.

Figure 2:
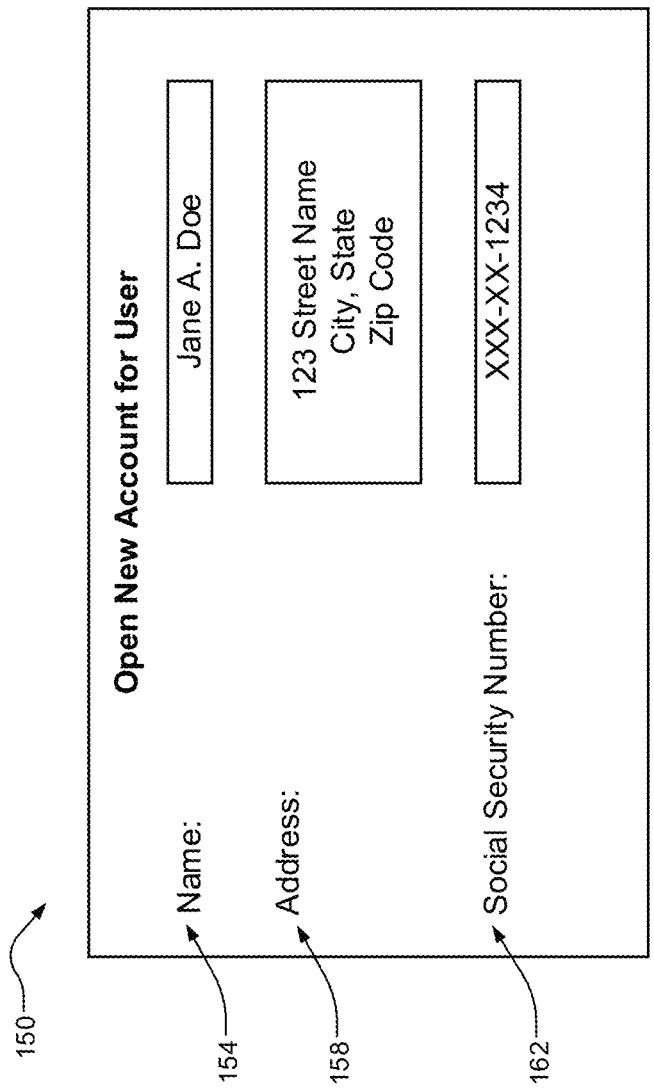
FIG. 2 is a representation of an example display presenting an example result according to the principles of the present disclosure.

FIG. 2 is a representation of an example display presenting an example result 150. For example, the result 150 could be displayed on a screen of an operator device during the process of opening a new account for a user. In the example process of FIG. 2, the content transformation system of FIG. 1 can obtain pieces of data from a remote database and transform the data into a result structure that the operator device and operator system can read and then display the transformed data in the corresponding fields during the process. For example, as is shown in FIG. 2, a name 154 is shown as Jane A. Doe. The name 154 is transformed data that, for example, was previously stored as separate pieces of data labeled different from the name 154. An address 158 is shown at 123 Street Name, City, State, Zip Code. Similar to the name 154, the transformed data may have been originally structured as separate pieces of information, which could not be consumed or read by the operator device. Additionally, the display shows a social security number 162 that is 220-XX-1234.

FIGS. 3A-3D are graphical representations of example data structures used to implement content transformation. FIG. 3A depicts an example set of instructions 204 stored in the instructions database 120 of FIG. 1. Each instruction in the set may be a transformation or a nested set of instructions.

The set of instructions 204 includes a first transformation 208, a second set of instructions 212, . . . , and an Nth Transformation 216. The set of instructions 204 includes a transformation or another set of instructions for each piece of data included in an information type. When the set of instructions 204 includes another set of instructions, such as the second set of instructions 212, the second set of instructions 212 represents a nested entry that is going to be created within the result.

In the form example described previously, the set of instructions that are used to transform a first form include a transformation for each field or each piece of data on the form. Therefore, a set of instructions corresponds to an information type or a form and specifically transforms the collected information on the form to data consumable by the operator device 104 of FIG. 1. In various implementations, each form version is considered a different information type and corresponds to a different set of instructions. Nested set of instructions such as the second set of instructions 212 correspond to a portion of the form. Each nested set of instructions is completed before continuing to the next transformation using a recursive call, described in more detail with respect to FIG. 5.

FIG. 3B depicts the first transformation 208. The first transformation 208 includes a class 220, including a method 224. The method includes a result type 228. The first transformation 208 also includes a field value 232. The class 220 includes different types of method(s) 224 to transform the piece of data, such as basic field mapping, which essentially copies the piece of data from the collected information and pastes the piece of data, using the same field name, into an entry of a result. In additional examples of basic field mapping method, the class 220 may indicate a specific implementation of the method 224, such as adding an entry to the result defined within the first transformation 208. The entry added to the result is defined in the specific instruction to avoid any unintended naming collisions within the result.

The class 220 primarily provides organization of methods, similar to a file folder. For each instruction in the set of instructions, the class 220 and method 224 are indicated, the class 220 indicating the folder in which to find the method 224 and the method including transformation logic. Additionally, because method references or names are not globally unique, including the class 220 is needed to identify the correct method 224. For example, adding the entry to the result may be called "AddStringField," which may be a method included in multiple classes.

In various implementations, the class 220 includes data objects common to the transformation logic of all method(s) 224 stored in the corresponding class 220. An additional example of a method 224 included in the basic field mapping class 220 is "AddStringValue." The "AddStringValue" is a method where a literal value defined in the instruction is copied to an entry of the result. For example, if a form is only distributed for checking accounts, the set of instructions could implement the "AddStringValue method to set an entry of the result field, defined as "AccountType" to "Checking" for every form of that type. This type of transformation does not involve any form field data, since the data you are placing in the result is hard coded as "Checking" in the instructions.

In various implementations, the class 220 and method 224 pair may include a condition upon which the entry is created. The class 220 and method 224 pair can also indicate whether the entry being created is nested. For example, if the first transformation is retrieving a first name and a last name to create a nested owner entry in the result, the class 220 and method 224 pair indicate that the owner entry is to be created, which is not being named after the field of the collected information, first name. The owner field is added to the result and, according to the transformation instruction of the method 224 included in the instruction, the first name would be added to the owner field.

Then, the second transformation would transform the field including the last name; however, the class of the second transformation would indicate that the last name is being added to the nested owner entry. In various implementations, the class 220 and method 224 pair may be indicated by a single input instead of a pair of identifying information (for example, by uniquely naming each method).

Additional methods include: adding an array or list of pieces of data to an entry, adding pieces of information in that are selected check boxes or radio buttons, searching a database operated by the operator or provide additional information for the user that is known to be stored in the database, splitting or combining name fields, parsing currency information to separate a currency and an amount, etc.

The result type 228 included in the method 224 indicates whether the transformed data is to be included in a particular result. For example, if the result is to include all information provided by the corresponding form, the result type 228 of the method 224 for each transformation would indicate that the transformed data is included in the same result. The field value 232 identifies a field name of the collected information and an entry name within the result, which is where to include the transformed data.

In various implementations, the transformation method included in the instructions specifically add a particular result type 228 to the result (for example, "AddStringField" adds a value of data type String to the result and "AddBooleanField" adds a true or false value of data type Boolean to the result. Since the type may be dictated by the method, the result type 228 may be included in the method 224. In various implementations, the result type 228 may be separate from the method 224. The method 224 also controls where and how data is placed in the result. Input parameters for the methods are included in the set of instructions to guide the method 224.

FIG. 3C shows an example first record 304 or collected information. The first record 304 includes an account number 308, a street 312, a city 316, a zip code 320, a first name 324, a last name 328, and an account type 332. The first record 304 is in a singular format without any nested information. That is, each piece of data is available at the first level and only defined as part of the first record 304. The first record 304 would be stored in the collected information database 116 of FIG. 1 and corresponds to information extracted from a user-completed form.

FIG. 3D is a first result 336 that has been transformed from the first record 304 into the first result 336. The operator device 104 of FIG. 1 can read the first result 336 and access the information included in the first result 336 (that is, the operator device 104 may not be able to parse the information stored in the first record 304). The first result 336 includes an account number 340, an owner 344, and an account type 348. The account number 340 and the account type 348 are singular entries while the owner 344 is a nested entry. The owner 344 includes an address 352, a first name 356, and a last name 360. The address 352 is nested while the first name 356 and the last name 360 are singular. The address 352 includes a street 364, a city 368, and a zip code 372. In an example, if the first record 304 is being transformed into the first result 336, each piece of data in the first record 304 corresponds to the entries of the first result 336 with the same name (if the same name is indicated in the instructions).

Figure 4:
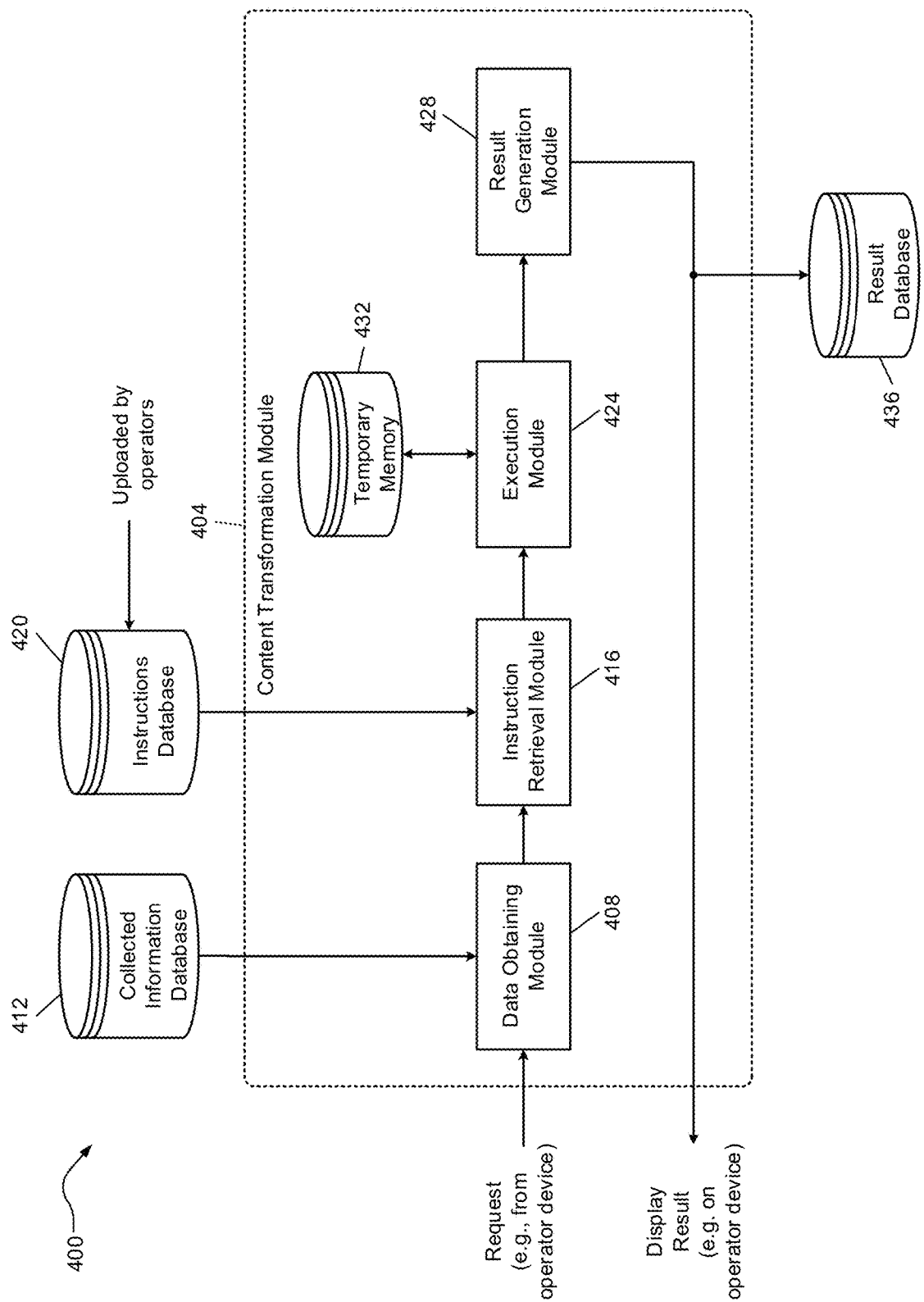
FIG. 4 is a functional block diagram of an example content transformation system according to the principles of the present disclosure.

FIG. 4 is a functional block diagram of an example content transformation system 100. A content transformation module 108 receives a request from an operator device. The request includes a user identifier and an information type. The information type may indicate a form number that includes the information that is being transformed. Otherwise, the information type includes another indication to instruct the content transformation module 108 as to (i) what collected information to retrieve and (ii) what instructions to select.

A retrieval data retrieval module 408 receives the request and, based on the information type, retrieves the corresponding record for the user identifier from the collected information database 116. The corresponding record and request are forwarded to an instruction retrieval module 416. The instruction retrieval module 416 selects a set of instructions from the instructions database 120 based on the information type included in the request. The sets of instructions stored in the instructions database 120 are created by operators. Each set of instructions corresponds to an information type, and instruct how to transform each piece of data included in the record into a result that the operator device can read. In various implementations, the instruction retrieval module 416 may select the corresponding set of instructions and each set of instructions referenced in the selected set of instructions.

The selected set of instructions and the retrieved record are forwarded to an execution module 424. The execution module 424 executes the set of instructions. The set of instructions includes for each piece of data included in the retrieved record, instructions for how to transform each piece of data into an entry included in the result. For example, if the first piece of data included in the retrieved record is a first name included in a first name field, the first transformation instruction in the set of instructions will instruct the execution module 424 to copy the data in the first name field and add a first name field to the result including the data. In another example, the instructions may create a nested owner entry and add the first name to the owner entry The execution module 424 constructs the result by adding each entry to a result generation module 428 to construct the completed result.

In various implementations, if the set of instructions includes an instruction to create a nested entry (in the form of another set of instructions), the execution module 424 may optionally temporarily store a copy of the retrieved record in a temporary memory 432. Then, the execution module 424 will create a nested construct for the result generation module 428 to add to the result. The execution module 424 can create the nested structure by adding the fields of the retrieved record that are included in the nested entry from the temporary memory 432. Storing the copy in the temporary memory 432 is performed to ensure the pieces of data contained in the record are not lost while each nested entry is created. Once a nested entry is complete, the copy stored in the temporary memory 432 is destroyed.

In various implementations, when the set of instructions includes a nested entry, the execution module 424 implements a recursive call technique using a "stack" data structure to store in the temporary memory 432 to track a last execution state of the set of instructions. For example, when a nested set of instructions is included in the "stack," the nested set of instructions is at the top of the "stack" and can be performed immediately. Once performed, the nested set of instructions are removed from the "stack" and the remaining instructions of the set of instructions are resumed. This method allows for infinitely nested structures.

Once each transformation or instruction of the set of instructions is complete, the transformed data included in an entry is forwarded to the result generation module 428. Then, the result generation module 428 adds each received entry to the result. Once the set of instructions is complete, the result generation module 428 transmits the result to the operator device for display. Optionally, the content transformation system 100 includes a result database 436 for storing each generated result.

Figure 5:
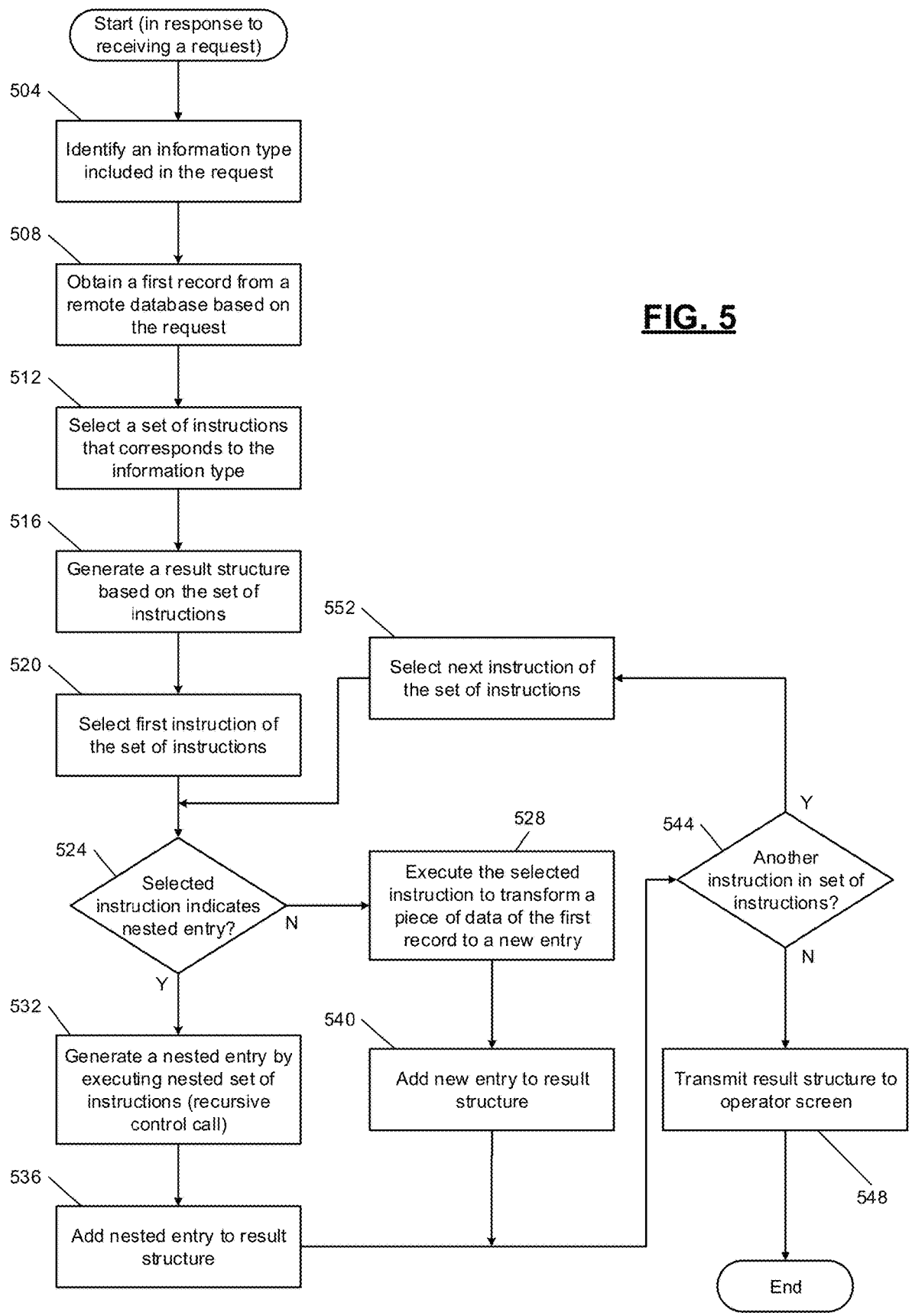
FIG. 5 is a flowchart depicting example processing of a content transformation request within a content transformation system according to the principles of the present disclosure.

Referring to FIG. 5, a flowchart depicting example processing of a content transformation request within a content transformation system is shown. Control begins in response to receiving a request. Once the request is received, control continues to 504 to identify an information type included in the request. The request may be from an operator device and may indicate a corresponding user to which the request pertains as well as the information type. The information type indicates what the request is for, such as opening an account, completing a trade, etc., and information needed for the request. The information may be pieces of data included in a particular form. Therefore, the information type may indicate a form number and version.

Control continues to 508 to retrieve a first record from a remote database based on the request. The first record corresponds to, for example, the particular form completed by the user indicated in the request. The forms that are stored on the remote database may be indexed according to a user identifier and further according to form numbers and versions. Once the first record is retrieved, control proceeds to 512 to select a set of instructions that corresponds to the information type. For example, sets of instructions may be stored on a database separate from the remote database. Each set of instructions corresponds to one information type (that is, each set of instructions corresponds to a different form).

Then, control continues to 516 to generate a result structure based on the set of instructions. At 520, control selects a first instruction of the set of instructions. Control proceeds to 524 to determine if the selected instruction indicates a nested entry. As described previously, the nested entry is indicated by a nested set of instructions within the set of instructions. If no, control continues to 528 to execute the selected instruction to transform a piece of data of the first record into a new entry. The selected instruction identifies the piece of data of the first record to transform as well as a method of transformation. As described above, the methods of transformation may include field mapping, generating a nested entry, etc.

Otherwise, control proceeds to 532 to generate a nested entry by executing the nested set of instructions. In various implementations, the nested instructions are performed by conducting a recursive call to implement the control of FIG. 5 to execute the nested set of instructions, which could also further include another nested set of instructions. For simplicity, at 532 the recursive call is depicted as executing the nested set of instructions to generate the nested entry. Then, control continues to 536 to add the nested entry to the result structure. Similarly, returning to 528, once the selected instruction transforms the piece of data of the first record into the new entry, control continues to 540. At 540, control adds the new entry to the result structure.

Then, control proceeds to 544 to determine if another instruction is included in the set of instructions. If no, control continues to 548 to transmit the result structure to the operator screen. Then, control ends. Otherwise, control continues to 552 to select the next instruction of the set of instructions. Then, control returns to 524 to determine if the selected instruction is a nested entry.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a memory configured to store,
a collected information database including a set of collected information for a first user,
an instructions database including a set of instructions for each information request type, and
computer executable instructions; and
a processor configured to execute the computer executable instructions, such that in response to receiving a first information request from an operator device, the processor performs a transformation of a display by:
determining a first information request type based on the first information request;
retrieving, from the collected information database, a first set of collected information;
selecting, from the instructions database, a first set of instructions corresponding to the first information request type, the first set of instructions including pre-determined transformation instructions, the first set of instructions selectively including an instruction to create a nested entry;
constructing a first result by executing each instruction of the first set of instructions to:
in response to a first instruction of the first set of instructions indicating a first entry of the first result is nested, create the first entry as the nested entry within the first result including data of the first set of collected information identified in the first set of instructions as nested by copying the set of collected information into a temporary memory and implementing a recursive call technique that adds fields from the temporary memory into the first entry of the first result based on a nested set of instructions included within a stack of instructions, and
in response to the first instruction of the first set of instructions indicating the first entry of the first result is singular, retrieve first data of the first set of collected information identified by the first instruction and add the first data to the first entry of the first result only after completion of the nested set of instructions; and
transforming the display of the operator device to complete a set of fields displayed on the display with corresponding entries of the first result.

2. The system of claim 1 wherein an indication that the first entry is nested includes the first instruction being a nested set of instructions.

3. The system of claim 2 wherein:
each nested instruction of the nested set of instructions is executed prior to executing a subsequent instruction of the first set of instructions and
the subsequent instruction is listed after the nested set of instructions.

4. The system of claim 2 wherein the nested entry includes a plurality of entries identified as corresponding to the nested entry in corresponding nested instructions of the nested set of instructions.

5. The system of claim 1 wherein the first information request type indicates a form number and a version number.

6. The system of claim 1 wherein the collected information database is a remote database and stores a plurality of sets of collected information extracted from forms submitted by users.

7. The system of claim 1 wherein the first information request is received from the operator device in response to the operator device initiating a process for the first user.

8. The system of claim 1 wherein the first result includes a number of entries corresponding to a number of instructions included in the first set of instructions.

9. The system of claim 1 wherein the first set of collected information corresponds to the first information request type.

10. The system of claim 1 wherein each entry of the first result corresponds to a field of the set of fields displayed on the display.

11. The system of claim 1 wherein the instructions include storing the first result in a result database.

12. The system of claim 1, wherein the processor is configured to select the first set of instructions that correspond to the first information request type using a selection tool configured to receive inputs from an operator to arrange the pre-determined transformation instructions to correspond to a particular form associated with the first information request type.

13. The system of claim 1, wherein the pre-determined transformation instructions being in the form of a method and a class pair, the class indicating a location of the method that includes transformation logic to transform the first set of collected information into the first entry of the first result, the method and class pair indicating whether the first entry of the first result is the nested entry or a singular entry.

14. A method comprising:
in response to receiving a first information request from an operator device:
determining a first information request type based on the first information request;
retrieving, from a collected information database, a first set of collected information, wherein the collected information database includes a set of collected information for a first user;
selecting, from an instructions database, a first set of instructions corresponding to the first information request type, wherein the instructions database includes a set of instructions for each information request type, the set of instructions including pre-determined transformation instructions, the set of instructions selectively including an instruction to create a nested entry;
constructing a first result by executing each instruction of the first set of instructions to:
in response to a first instruction of the first set of instructions indicating a first entry of the first result is nested, create the first entry as the nested entry within the first result including data of the first set of collected information identified in the first set of instructions as nested by copying the set of collected information into a temporary memory and implementing a recursive call technique that adds fields from the temporary memory into the first entry of the first result based on a nested set of instructions included within a stack of instructions; and
in response to the first instruction of the first set of instructions indicating the first entry of the first result is singular, retrieve first data of the first set of collected information identified by the first instruction and add the first data to the first entry of the first result only after completion of the nested set of instructions; and
transforming a display of the operator device to complete a set of fields displayed on the display with corresponding entries of the first result.

15. The method of claim 14 wherein an indication that the first entry is nested includes the first instruction being a nested set of instructions.

16. The method of claim 15 wherein:
   each nested instruction of the nested set of instructions is executed prior to executing a subsequent instruction of the first set of instructions and
   the subsequent instruction is listed after the nested set of instructions.

17. The method of claim 15 wherein the nested entry includes a plurality of entries identified as corresponding to the nested entry in corresponding nested instructions of the nested set of instructions.

18. The method of claim 14 wherein the first information request type indicates a form number and a version number.

19. The method of claim 14 wherein the collected information database is a remote database and stores a plurality of sets of collected information extracted from forms submitted by users.

20. The method of claim 14 wherein the first information request is received from the operator device in response to the operator device initiating a process for the first user.

21. The method of claim 14 wherein the first result includes a number of entries corresponding to a number of instructions included in the first set of instructions.

22. The method of claim 14 wherein the first set of collected information corresponds to the first information request type.

* * * * *